United States Patent

Schroeder et al.

[11] Patent Number: 5,941,595
[45] Date of Patent: Aug. 24, 1999

[54] METHOD AND APPARATUS FOR REDUCING LIFT AND DRAG OF A SOFT TOP PASSENGER VEHICLE

[75] Inventors: Del C. Schroeder, Bloomfield Hills; John G. Argeropoulos, Sterling Heights; Mark E. Gleason, Farmington Hills; Mike Zabat; Rolls F. Forster, both of Rochester Hills; William W. Doolittle, III, Ann Arbor, all of Mich.

[73] Assignee: Chrysler Corporation, Auburn Hills, Mich.

[21] Appl. No.: 08/851,263

[22] Filed: May 5, 1997

Related U.S. Application Data

[63] Continuation-in-part of application No. 08/645,991, May 14, 1996.

[51] Int. Cl.⁶ .................................................. B62D 35/00
[52] U.S. Cl. ....................... 296/180.1; 296/217; 296/219
[58] Field of Search ............................... 296/180.1, 107, 296/146.14, 118, 217, 219, 107.15, 107.09, 107.11

[56] References Cited

U.S. PATENT DOCUMENTS

| | | | |
|---|---|---|---|
| 2,002,596 | 5/1935 | Westrope | 296/107 |
| 2,556,565 | 6/1951 | Votpka | 296/118 |
| 3,091,494 | 5/1963 | Cohen | 296/219 |
| 3,529,862 | 9/1970 | Jousserandot | 296/180.1 |
| 3,604,661 | 9/1971 | Mayer, Jr. . | |
| 3,779,199 | 12/1973 | Mayer, Jr. . | |
| 3,929,202 | 12/1975 | Hobbensiefken . | |
| 3,929,369 | 12/1975 | Blair . | |
| 3,934,923 | 1/1976 | Lissaman et al. . | |
| 3,977,716 | 8/1976 | Whited . | |
| 3,999,797 | 12/1976 | Kirsch et al. . | |
| 4,022,508 | 5/1977 | Kirsch et al. . | |
| 4,035,013 | 7/1977 | Abbott, III . | |
| 4,056,279 | 11/1977 | Dorsch . | |
| 4,068,883 | 1/1978 | Meinecke et al. . | |
| 4,087,124 | 5/1978 | Wiley, Jr. . | |
| 4,102,548 | 7/1978 | Kangas . | |
| 4,170,378 | 10/1979 | Jacobsen . | |
| 4,210,354 | 7/1980 | Canning . | |
| 4,245,862 | 1/1981 | Buckley, Jr. . | |
| 4,257,640 | 3/1981 | Wiley . | |
| 4,257,641 | 3/1981 | Keedy . | |
| 4,313,635 | 2/1982 | Front . | |
| 4,375,898 | 3/1983 | Stephens . | |
| 4,611,847 | 9/1986 | Sullivan . | |
| 4,626,021 | 12/1986 | Muscat | 296/107.11 |
| 4,741,569 | 5/1988 | Sutphen . | |
| 4,836,473 | 6/1989 | Aulehla et al. | 244/130 |
| 4,863,211 | 9/1989 | Eash | 296/136 |
| 5,069,538 | 12/1991 | Shust et al. | 359/871 |
| 5,190,342 | 3/1993 | Marlowe et al. | 296/180.2 |
| 5,207,474 | 5/1993 | Licher et al. | 296/107.15 |
| 5,280,990 | 1/1994 | Rinard | 296/180.1 |
| 5,374,013 | 12/1994 | Bassett et al. | 244/130 |

FOREIGN PATENT DOCUMENTS

| 3207409 | 9/1983 | Germany | 296/180.1 |
|---|---|---|---|

*Primary Examiner*—Dennis H. Pedder
*Attorney, Agent, or Firm*—William J. Coughlin

[57] ABSTRACT

A method and apparatus for increasing the reducing the lift and drag of a soft top passenger vehicle having a soft top having first and second edges in which the point at which flow over the vehicle separates is determined by conventional techniques and an aerodynamic deflector is provided and attached to the roof of the vehicle forward of the separation point at a position that maximizes aerodynamic efficiency.

7 Claims, 3 Drawing Sheets

METHOD AND APPARATUS FOR REDUCING LIFT AND DRAG OF A SOFT TOP PASSENGER VEHICLE

This application is a continuation-in-part of Ser. No. 08/645,991, filed May 14, 1996, entitled "Method and Apparatus for Reducing Lift and Drag of a Passenger Vehicle."

BACKGROUND OF THE INVENTION

1. Field of the Invention

This invention relates generally to an apparatus and method for reducing lift and drag of a soft top passenger vehicles by attaching a deflector along the roof of the vehicle at a previously determined location to change the separation point between attached and separated flow.

2. Background of the Invention

It is an ongoing goal of automobile designers and engineers to reduce the aerodynamic drag over the vehicle and lift on the rear axle. Reducing aerodynamic drag and lift has the effect of increasing fuel efficiency or increasing speed for a given horsepower, as well as improving handling characteristics. Even small improvements in fuel efficiency can reduce operating costs significantly.

Considerable effort has been initiated towards reducing aerodynamic drag and lift in vehicles having articulated bodies, that is, between truck tractor cabs and their associated trailer bodies. While the problem has been well-addressed in that context, resulting in widespread use of air deflectors mounted on tractor cabs, single body passenger vehicles present a different problem, as different fluid mechanics considerations apply. The need for reduced lift and drag exists there as well, in the form of a practical device to do so without changing the overall appearance of the vehicle.

The method and apparatus of the present invention are based on a balancing of two fluid mechanics effects that occur as air moves over a passenger vehicle. The first effect occurs as the air moves along the curved roof of the passenger vehicle. As it does so it accelerates locally where surface curvatures are positive. Acceleration is proportional to the magnitude of the curvation, i.e., the sharper the turn, the higher the acceleration. Accelerating flow causes low pressure, which in turn causes increased lift and drag. The higher the speed, the lower the pressure acting on the surface, and the more the drag and the lift. In most passenger vehicles, surfaces transition from being mostly upward facing to being mostly rearward facing. In the region where the transition occurs, the curvature in the surface accelerates the flow locally if the flow remains attached. The pressure in this area will be low, and since the surface in this region faces both up and back, the pressure acts to increase both the lift and drag of the vehicle.

The second effect occurs after the air stream passes the transition point. Globally, the flow decelerates in this region because the area available is increasing. It continues to do so until it separates from the surface. Beyond this separation point, a low pressure stall area exists, which again subjects the rearward facing area behind the separation point to low pressures, which again is a major contributor to drag and lift. The further forward the separation point is, the larger the area exposed to this low pressure region.

Generally, a long, gently sloped surface (e.g., the top of an airfoil) that provides a gradual deceleration of the flow and avoids separation as long as possible is favorable for decreasing the drag. However, in passenger vehicles, the curvature in the transition area from upward to downward rearward is to a degree such that the low pressure generated locally (the first effect) causes an increase in lift and drag that is larger than the overall lift and drag that would be experienced if the flow had separated earlier, despite the second effect. The purpose of the present invention is to force the flow to separate sooner, before the adverse effects of flow over the curvature (the first effect) outweigh the lift and drag penalty of moving the separation point forward (the second effect). By doing so, overall lift and drag are decreased.

SUMMARY OF THE INVENTION

The present invention provides a method and apparatus for reducing the lift and drag of a soft top passenger vehicle by reducing the lift and drag produced by relative air flow over the vehicle, by changing the point at which separated flow occurs. The present invention improves the fuel efficiency of the vehicle, without significantly altering physical dimensions or appearances, and comprises a raised laterally extending deflector attached to or integrated into the soft top of the vehicle, such as by sewing in a rigid insert or providing a raised seam. The deflector changes the point at which the flow over the vehicle separates, resulting in less overall lift and drag, and the method of the present invention comprises determination of the appropriate point of attachment to maximize the reduction in lift and drag.

It is an object of the present invention to provide a method and apparatus for reducing the lift and drag of a soft top vehicle. It is a further object of the present invention to reduce lift and drag without changing the physical appearance or dimensions of a vehicle.

DETAILED DESCRIPTION OF THE PREFERRED EMBODIMENT

Figure 1:
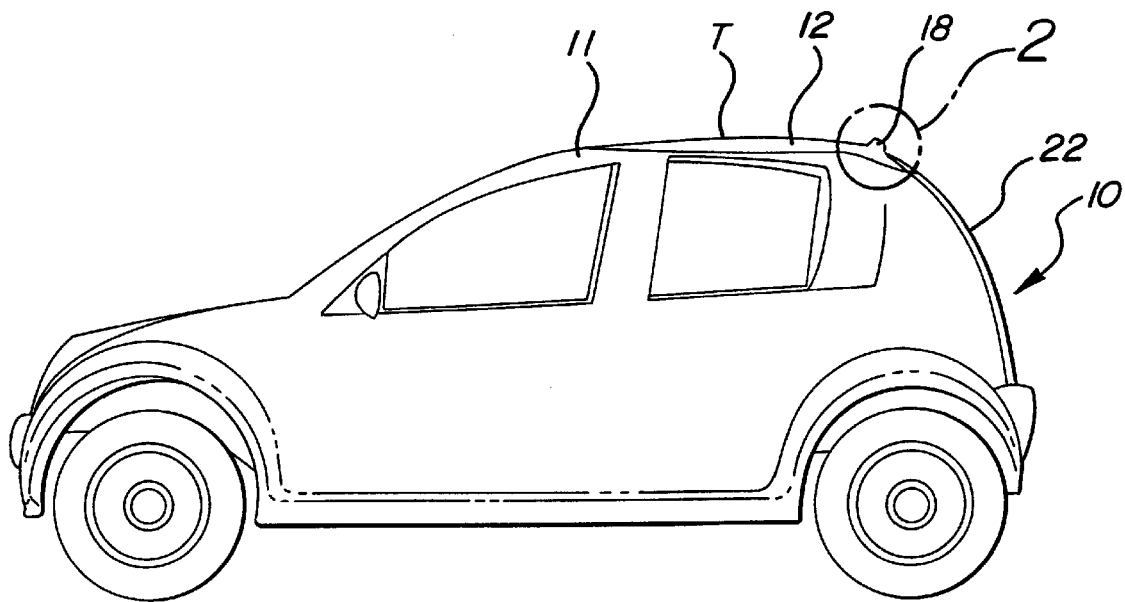
FIG. 1 is a perspective view of a soft top vehicle which incorporates the apparatus of the present invention.
Figure 4:
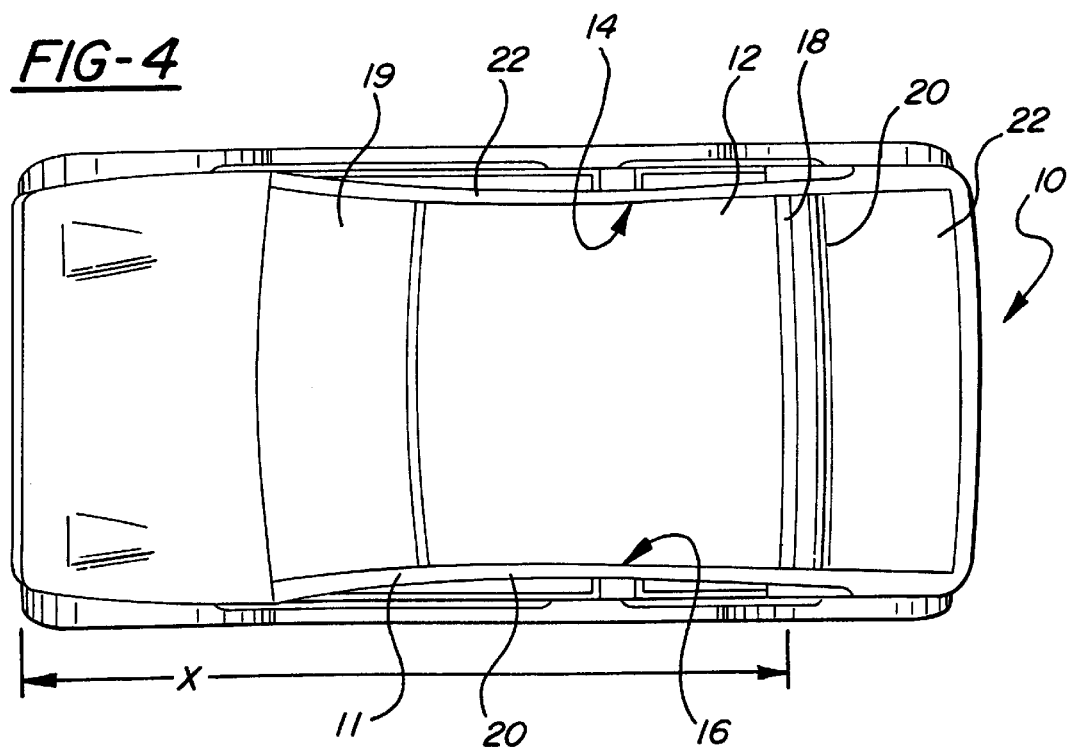
FIG. 4 is a top view of a soft top vehicle on which the apparatus of the present invention is mounted.

Turning to FIG. 1, FIG. 4, and FIG. 7, a soft top passenger vehicle on which the apparatus of the present invention is installed is shown. Vehicle 10 (not claimed) comprises a vehicle with a removable soft top 12, such as Chrysler's China Concept Vehicle. Soft top 12 is retractable and is inserted via edges 14 and 16 into slots (not shown) of vehicle 10. The method and apparatus of the present invention are not limited to use with this type of soft top vehicle or with a soft top vehicle of the profile shown, however, and may be used with any vehicle having a generally curved soft top. Deflector 18 is shown installed on soft top 12 at approximately the top edge 20 of backlight (rear window) 22. As can be seen from FIG. 1, the roof of vehicle 10 initially slopes upward and then slopes backwards and downward starting at approximately transition point "T."

Figure 2:
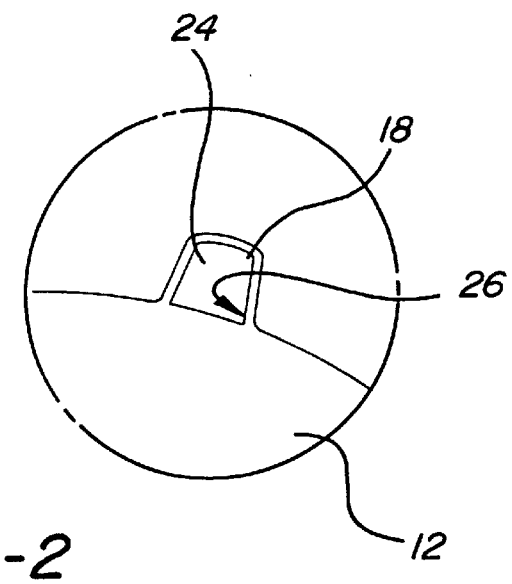
FIG. 2 is a detailed view of a portion of FIG. 1.

The details of one embodiment of deflector 18 are shown in FIG. 2. In this embodiment, deflector 18 consists of a rigid insert sewn into the soft top material. It may also comprise a raised seam, a seam that is intentionally made larger than a normal convertible soft top seam, which may be constructed by adding excess top material and gathering it together. Here, insert 24 is inserted and sewn into envelope 26 sewn into top 12. The deflector embodiment shown is substantially rectangular in cross section. It need not be so, however, as any shape that causes flow to separate will suffice. Either the leading edge or the trailing edge of the deflector preferably is as sharp as possible, however, to ensure that separation does occur. The minimum height of the deflector is approximately the height of the fluid boundary layer momentum thickness at the deflector location. It can be taller, to ensure complete separation along the entire span at all possible attitudes, but it should not be so high that it increases the vehicle's frontal area. The width of the deflector is not critical, and generally a width of about twice the height is sufficient. The embodiment shown has a height of approximately 4 mm and a width of approximately 10 mm, which was the dimension used in Chrysler's concept testing.

In the embodiment shown in FIG. 2, deflector 18 is built into the soft top at manufacture. It may also be a separate structure such as a piece of metal, roof fabric, or plastic that is attached to the soft top by appropriate means such as snaps, either at manufacture or afterwards, and which is either permanently attached or removable. This offers the advantage of allowing application of the method and apparatus of the present invention to existing vehicles, and also allows ease of manufacture of the apparatus of the present invention in that it need not be integrated into the vehicle soft top at initial manufacture. It should be noted that the present invention moreover does not effect appreciably the appearance or aesthetics of the vehicle, as it comprises a relatively small deflector.

Figure 3:
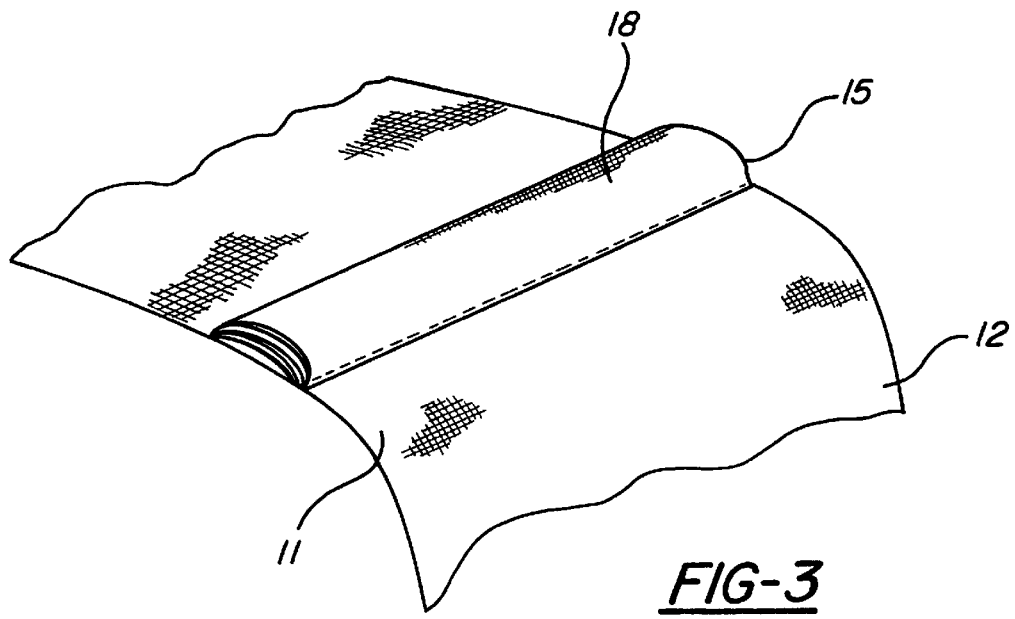
FIG. 3 is a detailed view of a section of a soft top on which another embodiment of the apparatus of the present invention is mounted.

FIG. 3 shows another embodiment of the apparatus of the present invention. Deflector 18 (shown enlarged) comprises an enlarged seam manufactured by gathering excess soft top material together and sewing it together to form a raised seam.

It is preferred that the soft top be otherwise relatively smooth and continuous and free of discontinuities cause by traditional soft top supporting ribs and other types of protuberances which may inadvertently cause flow to separate prior to reaching the deflector, however, this need not be the case.

Turning again to FIG. 4, vehicle 10 is shown from the top. It can be seen that top 11 of vehicle 10 further comprises edges 14 and 16. Vehicle 10 further comprises front window 19 and backlight 22. Deflector 18 is shown installed extending laterally from edge 14 to edge 16. It need not extend from edge to edge, but preferredly does so to achieve the maximum effect at all attitudes of the vehicle, such as when yaw is present. The deflector generally extends perpendicular across the vehicle roof, but may have a slight curve in either direction (forward or backward).

The location of deflector 18 fore and aft also is shown on FIG. 4. The precise location of the deflector in that direction should be determined according to the method of the present invention by conventional wind tunnel testing to optimize the reduction in lift and drag. The deflector is located forward of the natural separation point of the vehicle, to move the separation point forward. It preferably is located at a point where the maximum reduction in lift and drag is achieved accounting for the two fluid mechanics effects discussed above, namely, the low pressure caused by locally accelerating attached flow and the low pressure caused by global separation of flow. This point of maximum efficiency presently can only be achieved empirically. Generally this point will be located at a position on the roof aft of the transition point, forward of the natural separation point, and forward of the location where the highest curvature starts. This location varies depending upon the shape of the vehicle, however.

As shown in FIG. 4, in Chrysler experiments involving the concept profile, the deflector was located at a distance x of 3550 mm from the front end, just above the backlight, to achieve maximum reduction in lift and drag. In Chrysler experiments a deflector of generally rectangular cross section of a height of 4 mm and width of 10 mm resulted located at that point resulted in an overall decrease in coefficient of drag of 4.4% and a decrease in lift of over 20%. The effectiveness of the present invention will vary depending on the overall shape of the vehicle, the slope used, the attachment point, and the flow conditions.

Figure 5:
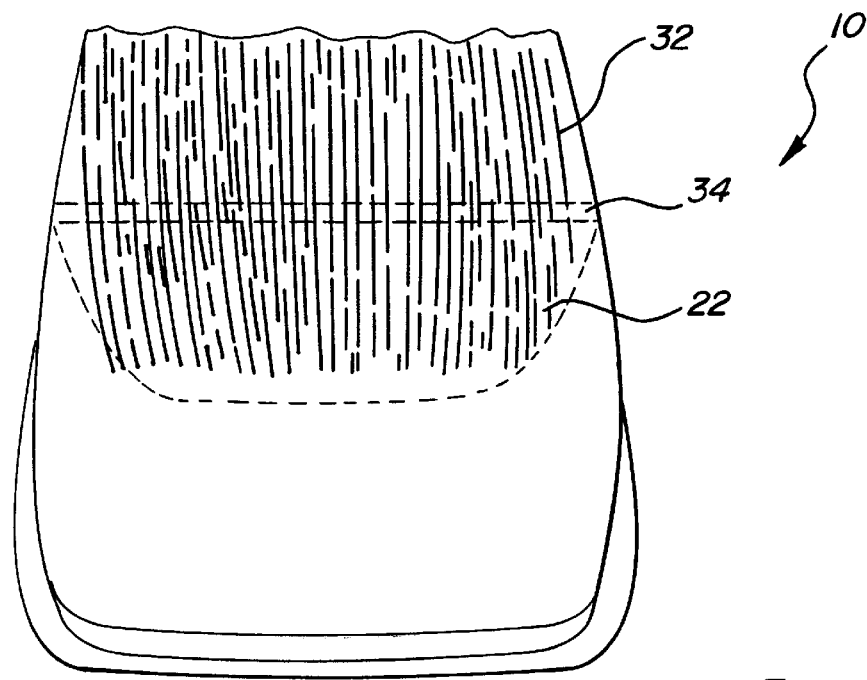
FIG. 5 is a partially cut-away schematic view of fluid flow over a soft top vehicle on which the apparatus of the present invention is not mounted.

Turning to FIG. 5, a partially cut-away cross section of a vehicle is shown from the top with streak lines 32 such as those generated by conventional techniques in a wind tunnel by surface flow conditions using graphite oil. This figure replicates results achieved in Chrysler testing. Dotted lines 34 show the location of the deflector (not installed), and it can be seen by streak lines 26 that without the deflector, flow remains attached well downstream of the deflector, onto backlight 22 (also shown with dotted lines).

Figure 6:
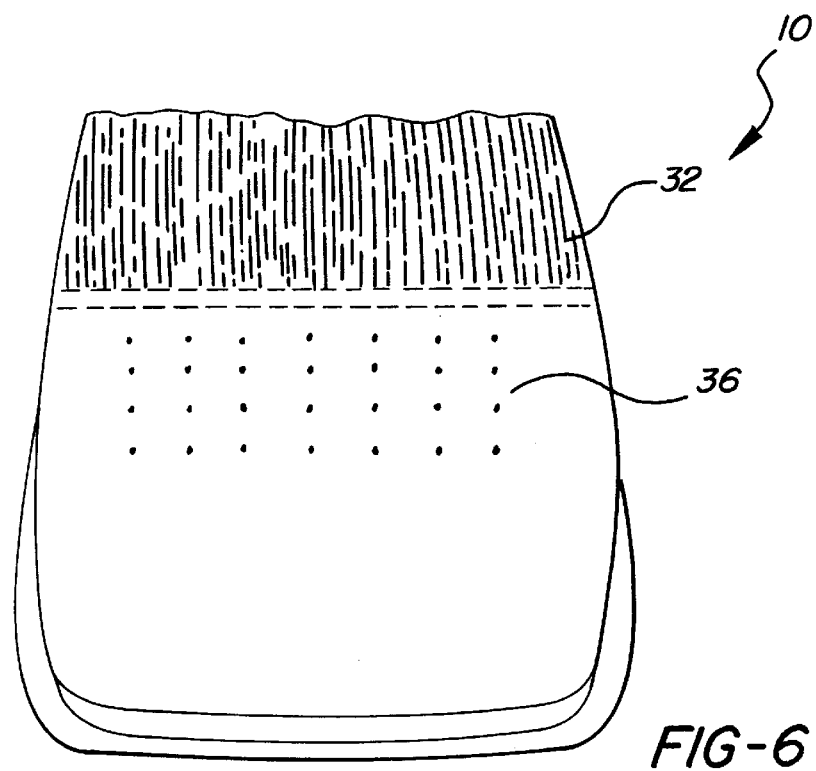
FIG. 6 is a partially cut-away schematic view of fluid flow over a soft top vehicle on which the apparatus of the present invention is mounted.

In comparison, FIG. 6 which again replicates Chrysler concept testing, shows a top view of the flow over the same vehicle 10 with the deflector 18 installed. It can be seen that separation of flow occurs at the deflector 18, as indicated by the absence of streak lines 32 downstream of the deflector. Dots 36 are dots of oil not picked up by attached flow to form streak lines.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A top for motor vehicle having a windshield, the top comprising:

a pair of rigid side panels;

a continuously curved center portion located laterally between said side panels and extending rearward from the windshield, said continuously curved center portion rearwardly translating from a positively sloped portion to a negatively sloped portion, said continuously curved center portion having a natural separation line at which an air flow over the motor vehicle normally separates therefrom; and an aerodynamic deflector attached to said negatively sloped portion of said continuously curved center portion, said aerodynamic deflector having a width extending longitudinally to the motor vehicle and a height, said width being greater than said height, said aerodynamic deflector being sewn into said center portion such that said center portion covers a forward side, an upper side and a rear side of said aerodynamic deflector;

whereby said aerodynamic deflector reduces lift and drag of said continuously curved center portion by causing said air flow to separate from said continuously curved center portion forwardly of said natural separation line.

2. The top for a motor vehicle of claim 1, wherein said width of said deflector is approximately twice said height.

3. The top for a motor vehicle of claim 1, wherein said width is more than twice said height.

4. The top for a motor vehicle of claim 1, wherein said width is approximately 10 mm and said height is approximately 4 mm.

5. The top for a motor vehicle of claim 1, wherein said deflector has a substantially rectangular cross section.

6. The top for a motor vehicle of claim 1, wherein said top is a soft top.

7. The top for a motor vehicle of claim 1, wherein said center portion has first and second laterally spaced apart edges, and further wherein said deflector extends substantially the entire distance between said first and second laterally spaced apart edges.

* * * * *